Figure 1:
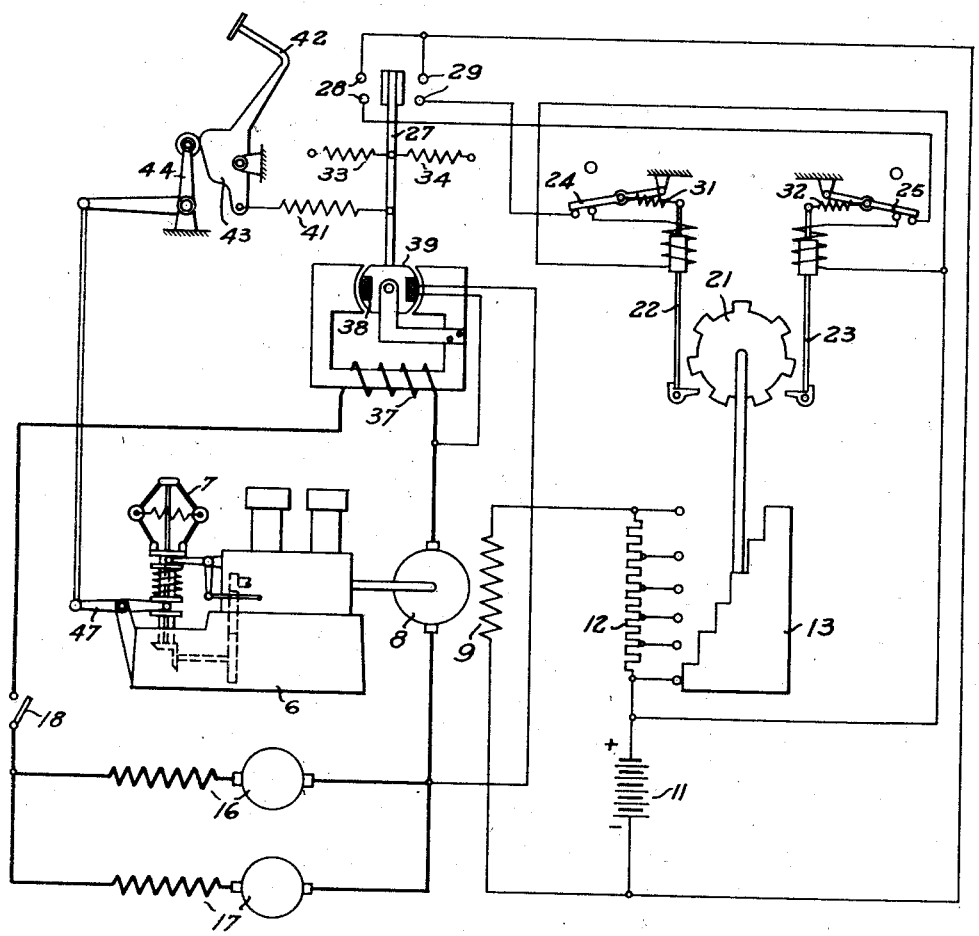

Nov. 2, 1937.　　　　T. BUCHHOLD　　　　2,098,177
ELECTRIC DRIVE SYSTEM
Filed Sept. 16, 1932　　　2 Sheets-Sheet 2

Inventor
T. Buchhold
by [signature]
Attorney

Patented Nov. 2, 1937

2,098,177

UNITED STATES PATENT OFFICE 2,098,177

ELECTRIC DRIVE SYSTEM

Theodor Buchhold, Mannheim-Neuostheim, Germany, assignor to Aktiengesellschaft Brown Boveri & Cie., Baden, Switzerland, a joint-stock company of Switzerland Application September 16, 1932, Serial No. 633,469
In Germany September 16, 1931

10 Claims. (Cl. 290—17)

This invention relates to improvements in a system for controlling the operation of an electrically propelled vehicle and more particularly to a control system for a prime mover-electric drive for vehicles.

When automotive vehicles are provided with a prime mover driving a generator which supplies electric current to one or more traction motors, means must be provided either for controlling the speed of the prime mover or the excitation of the generator or both to control the speed of the vehicles. If the prime mover operates at a constant speed and the excitation of the generator is controlled directly by the operator of the vehicle, when the load is increased or a grade is encountered in the roadway, increases of generator excitation would tend to cause the generator to assume a load beyond the output of the prime mover. The result of such operation would be stalling of the prime mover. On the other hand, the speed of the prime mover may be varied and the generator excitation may remain unchanged. Under such conditions, when the vehicle is to be operated at constant speed the generator must be operated below saturation, thus requiring a larger generator than desirable. If the generator is operated at saturation, the full output of the prime mover can only be utilized at highest speeds and hence at the higher voltages of the generator. At lower vehicle speeds where the traction motors require only a lower voltage, the full prime mover capacity cannot be utilized because of the low speed of such prime mover.

It is, therefore, an object of the present invention to provide a control system for electrically propelled vehicles having a prime mover source of power in which the excitation of the generator is automatically controlled in response to the load.

Another object of the invention is to provide a control system for a prime mover-electric drive for vehicles in which automatically and manually operable means cooperate to control the excitation of the generator.

Another object of the invention is to provide a control system for a prime mover-electric drive for vehicles in which automatically and manually operable means cooperate to control the excitation of the generator and the manually operable means may be employed to control the operation of the prime mover.

Another object of the invention is to provide a control system for a prime mover-electric drive for vehicles in which the speed of the prime mover and the excitation of the generator are controlled by the same means.

Figure 2:
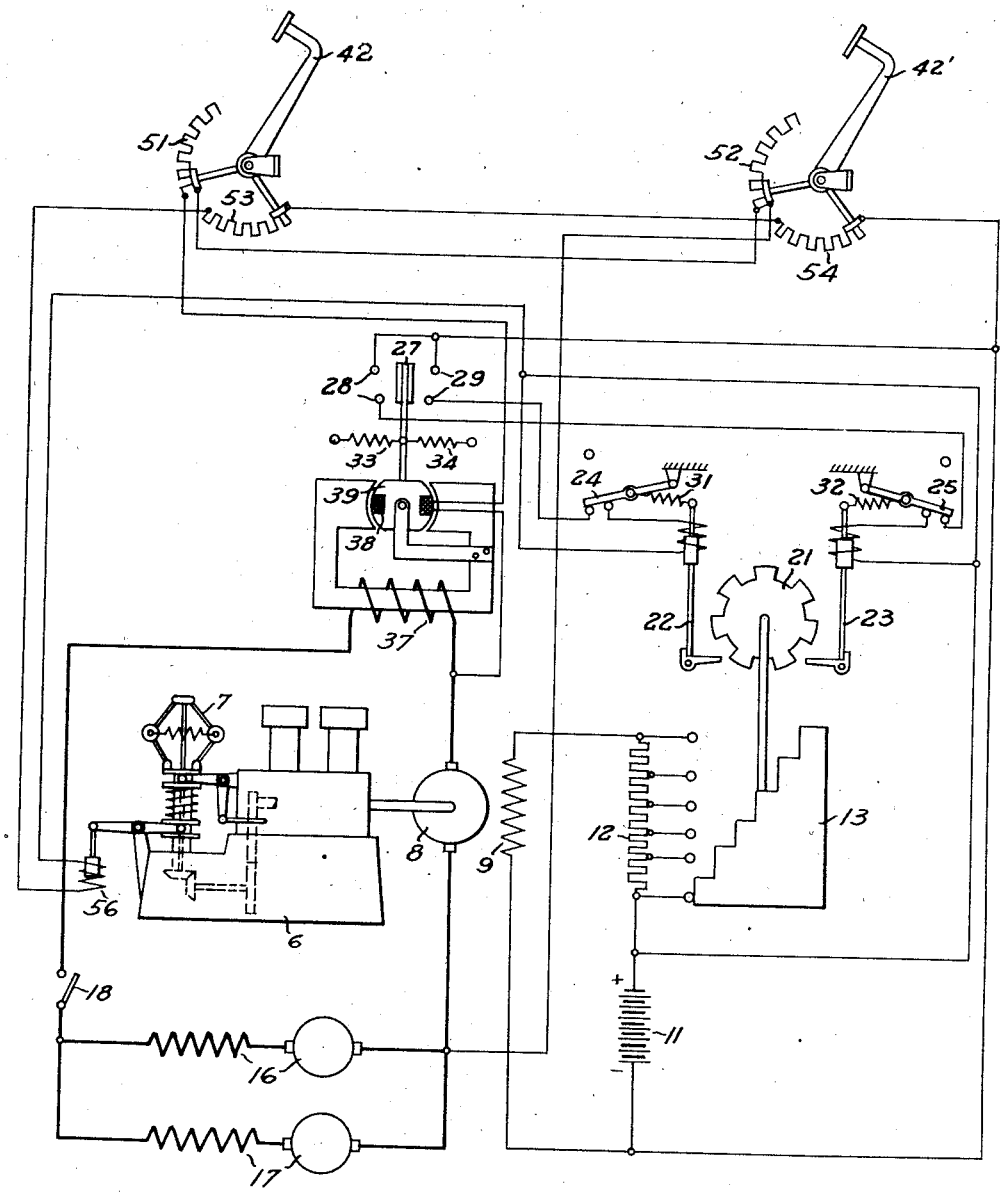

Objects and advantages other than those above set forth will be apparent from the following description when read in connection with the accompanying drawings in which:

Fig. 1 diagrammatically illustrates one embodiment of a prime mover-electric drive for vehicles in which combined electrical and mechanically operated means are employed to control the speed of the prime mover and the excitation of the generator;

Fig. 2 diagrammatically illustrates a modified embodiment of the invention in which purely electrical means are employed to control the operation of both the prime mover and the generator.

Referring more particularly to the drawings by characters of reference, the reference numeral 6 designates a prime mover such as an internal combustion engine, the speed of which is controlled by a speed governor 7. The engine 6 is coupled with and drives the rotor 8 of a generator having a stator winding 9 connected with a source of excitation current such as a battery 11 through a resistance 12. The amount of resistance 12 in circuit with the winding 9 is controlled by a controller 13 which is operated by means to be described hereinafter. The generator 8, 9 supplies electric current to a plurality of traction motors 16 and 17 which are shown as being connected in parallel, though it will be understood that such motors may be connected in series or in series-parallel if a sufficient number of motors is present. The motors may be disconnected from the generator by means of a switch 18 when such disconnection is desired.

The controller 13 is connected with a latch or ratchet wheel 21 which is rotatable in one direction or the other by means of electromagnetically operated pawls 22 or 23. The circuits to the coils of the pawls from battery 11 are cooperatively controlled by switches 24 or 25 and a switch 27 opening and closing the circuits at contacts 28 and 29. Switches 24 and 25 are connected with pawls 22 and 23 respectively by springs 31 and 32 respectively which are so attached to the pawls and switches as to cause the switches to snap upward and downward upon operation of the pawls to open and close the contacts for such switches.

Switch 27 is returned to its neutral or midpoint position by means of oppositely acting springs 33 and 34 after movement into contact with either pairs of contacts 28 or 29 by a wattmetric member which comprises a current coil 37 connected in series with the traction motors and a voltage coil 38 connected across the terminals of the generator and mounted on an armature 39 on which the switch 27 is likewise mounted. The switch 27 is connected by a spring 41 with a foot pedal or hand lever 42 having a cam surface formed thereon or a cam 43 connected therewith. A pivoted bell crank lever 44 has one end thereof movable in contact with the cam 43 of the pedal 42 and the other end of the bell crank 44 is connected through a rod 46 with a lever 47. The lever 47 is connected with the speed governor 7 of the prime mover 6 and is operable to vary the speed of the prime mover. It will be understood of course that the ratchet wheels and electromagnetically operated pawls illustrated as operating means for the controller 13 may be replaced by wholly electrically operated means or pneumatically operated means such as are well known in the art, such means then being electrically controlled by opening and closing of the contacts 28 and 29 as will be described. It will also be understood that lever 44, rod 46 and lever 47 may be omitted if it is not desired that prime mover 6 be controlled and that the operation of the prime mover 6 may be controlled in any one of a number of ways merely by changing the curvature of the cam 43.

Assuming that the engine 6 is in operation and is not connected with the pedal 42 for variation of the speed thereof and that switch 18 is closed, when the several elements of the system are in the position shown, all of the resistance 12 is in circuit with the winding 9 and only a low voltage is delivered to the motors 16 and 17. If increased power is desired for any reason, pressure on pedal 42 causes tensioning of spring 41 which moves switch 27 in a counter-clockwise direction to bridge contacts 28 against the action of spring 34. Bridging of contacts 28 completes a circuit from battery 11 through the coil of pawl 23 and switch 25 back to the battery, the pawl is lifted and engages a tooth of ratchet 21 thereby rotating controller 13 in a counter-clockwise direction thus decreasing the amount of resistance 12 in circuit with winding 9. Switch 25 is opened upon lifting of the pawl and interrupts the flow of current through the above circuit. The coil of the pawl is then deenergized and the pawl drops, thereby again closing switch 25 which again completes the circuit and causes rotation of controller 13 by a distance equal to the width of another tooth of the ratchet 21. The above cycle of operations is repeated and such an amount of resistance 12 is removed from the circuit as will increase the voltage and the current of the generator to the amount required by the load on the motors. At such voltage and current the coils 37 and 38 will act on the armature carrying switch 27 against the tension of spring 41 and the switch will be returned to its neutral position. The circuit of the coil of pawl 23 is then interrupted and counter-clockwise operation of controller 13 ceases regardless of continued pressure on pedal 42. Upon increase of the pressure on the pedal the tensioning of the spring 41 is again increased and overcomes the force of coils 37 and 38 to again complete bridging of contacts 28. The above cycle of operations is then again repeated until switch 27 is returned to the neutral position as above described. Pressure on the pedal may then be further increased until the output of the generator is sufficient and such increases in pressure are continued as long as required.

If the pressure on the pedal is released and the load decreases, armature 39 is returned to the mid-position by springs 33 and 34 and the action of coils 37 and 38 causes switch 27 to bridge contacts 29 thereby completing a circuit through the coil of pawl 22. Pawl 22 is now operated in a manner similar to that described for pawl 23 with the result that controller 13 is rotated in a clockwise direction, thereby increasing the amount of resistance 12 in circuit with the winding 9. The output of generator 8, 9 is then decreased until an equilibrium is established between the wattmetric relay and the spring 41 and the generator continues to operate at the lower output. If the load on the motors increases suddenly and the generator output being maintained at such time is below that required by the increase in load, the cooperating action of coils 37 and 38 on switch 27 will complete movement of such switch into contact with the contacts 28 thereby causing the operation of pawl 23 as described above. Such action of the wattmetric relay and the pawl 23 continues until the load on the motors has dropped whereupon springs 33 and 34 will return the switch 27 to the mid-position, or, in case the load has fallen below the amount for which the wattmetric coils were adjusted, the clockwise action of the coils 37 and 38 on the switch 27 will cause bridging of contacts 29 which will then complete the circuits to the pawl 22 as above described and it will cause reversing operation of the controller 13. The automatic operation of the wattmetric relay continues therefore and takes place, regardless of the tension on the spring 41, in response to the load of the generator.

If the load on the generator is increased suddenly and the generator output is being maintained below that required by the increase in the load, assuming that the cam 43 connected with or forming a part of the foot pedal 42 is connected through the lever system 44, 46 and 47 with the speed governor 7, pressure on the pedal 42 not only increases the generator excitation as above described but also increases the speed of the engine 6 through the variation of the position of the speed governor. The generator excitation increases automatically but the engine speed is directly controlled by the shape of the cam 43. The cam, therefore, may be so shaped as to cause any desired modification of the operation of the engine, thereby permitting operation of the engine at any number of desired constant speeds with rapid increase or decrease of speed through the critical speed ranges of the engine. If the cam and lever system are omitted altogether the engine will run at constant speed and only the generator excitation will be controlled. The present system, therefore, provides a simple method of regulation by avoiding overloading and stalling of the engine, and automatically adjusts the generator excitation to the load on the traction motors.

Instead of the mechanical connection of spring 41 between pedal 42 and the wattmetric member and the mechanical connection between the pedal and the speed governor 7, the regulation of either the generator excitation or the engine speed or both may be brought about by purely electrical means. A system embodying such electrical means is illustrated in Fig. 2 and is similar to that illustrated in Fig. 1 except that the action of spring 41 is replaced by variable resistances 51 and 52 connected in series with the voltage coil 38 and that the mechanical connection between pedal 42 and speed governor 7 is replaced by a solenoid 56 connected in series with the variable resistances 53 and 54. Two sets of resistances are shown for the purpose of illustrating the use of the system when applied to a vehicle having a plurality of operator positions. The effective value of each set of resistances 51, 52 and 53, 54 is then controlled and varied by movements of either the foot pedal 42 or the similar foot pedal 42'. If the vehicle is provided with only one operator position, it will be understood that only one set of resistances and one foot pedal will be required. The coils of the pawls 22, 23 are connected through the contacts 28, 29 with the battery 11 as shown in Fig. 1.

The modified embodiment illustrated in Fig. 2 operates in a manner similar to that illustrated in Fig. 1 except that the resistances 51, 52 control and vary the degree of energization of the coil 38 and thereby the torque of the wattmetric relay, and the resistances 53, 54 control and vary the degree of energization of the solenoid 66 as will be understood.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a control system for vehicles having a prime mover driving a generator comprising a field excitation winding and an armature winding supplying electric current to a traction motor, a source of electric current for exciting the generator, a resistance connected with said source and with said excitation winding, a controller for varying the amount of said resistance in circuit, a ratchet wheel connected with said controller, electromagnetically operated means for actuating said wheel, a wattmetric relay connected with said generator and variably actuated responsive to and in dependence upon variations of power supplied thereby to said motor for controlling the operation of said means, and manually operable means for modifying the action of said relay.

2. In a control system for vehicles having a prime mover driving a generator comprising a field excitation winding and an armature winding supplying electric current to a traction motor, a source of electric current for exciting the generator, a resistance connected with said source and with the said excitation winding, a controller for varying the amount of said resistance in circuit, a ratchet wheel connected with said controller, electromagnetically operated means for actuating said wheel, a wattmetric relay connected with said generator and variably actuated responsive to and in dependence upon variations in power supplied thereby to said motor for controlling the operation of said means, manually operable means for modifying the action of said relay, and electromagnetically operated means operable by the last said means for varying the speed of the prime mover.

3. In a system of the character described, in combination, a prime mover having means operated thereby for governing the supply of operating fuel thereto, an electric current generator driven by said prime mover, a load circuit supplied with energy by said generator, an excitation circuit for said generator having a resistance included therein, means for affecting said resistance to vary the excitation of said generator, means operable responsive to and in dependence upon changes in power supplied by said generator to the first said circuit for controlling operations of the second said means, and means for modifying at will the operations of the first and third said means.

4. In a system of the character described, in combination, a prime mover having means operable thereby for governing the supply of operating fuel thereto, an electric current generator driven by said prime mover, a load circuit supplied with energy by said generator, an excitation circuit for said generator having a resistance included therein, means for affecting said resistance to thereby vary the excitation of said generator, means connected with and operable responsive to changes in the power supplied by said generator to the first said circuit for controlling the operation of the second said means, a resistance included in the connections of the third said means with said load circuit, and means operable to affect the last said resistance to thereby modify the operation of the third said means, the fourth said means including an element for affecting the operation of the first said means.

5. In a motor control system, in combination, a motor, a source of power for the motor, means for automatically increasing the voltage applied to the motor step-by-step to accelerate the motor, means for automatically decreasing said applied voltage step-by-step, and means responsive to the power supplied to the motor for controlling the operation of said voltage applying means.

6. In a motor control system, in combination, a motor, a source of power for the motor, switching means for varying the voltage applied to the motor, means for automatically controlling the operation of said switching means, means for operating said controlling means to cause the voltage applied to the motor to be both increased and decreased step-by-step, and means responsive to the power supplied to the motor for governing the operation of said operating means.

7. In a motor control system, in combination, a motor, a source of power for the motor, switching means for varying the voltage applied to the motor, a sequence drum for automatically controlling the operation of said switching means, means for both advancing and retracting the sequence drum notch-by-notch to cause the voltage applied to the motor to be increased or decreased step-by-step, and relay means responsive to the current and the voltage supplied to the motor for governing the operation of the sequence drum.

8. In a motor control system, in combination, a motor, a source of power for the motor, switching means for varying the voltage applied to the motor, a sequence drum for automatically controlling the operation of said switching means, means for both advancing and retracting the sequence drum notch-by-notch to cause the voltage applied to the motor to be increased or decreased step-by-step, and means responsive to the power supplied to the motor for governing the operation of the sequence drum.

9. In a motor control system, in combination, a motor, a source of power for the motor, switching means for varying the voltage applied to the motor, a sequence drum for automatically controlling the operation of said switching means, a notching mechanism for advancing the sequence drum, a notching mechanism for retracting the sequence drum, and relay means responsive to the power supplied to the motor for governing the operation of the sequence drum.

10. In a motor control system, in combination, a motor, a source of power for the motor, switching means for varying the voltage applied to the motor, a sequence drum for automatically controlling the operation of said switching means, a notching mechanism for advancing the sequence drum, a notching mechanism for retracting the sequence drum, interlocking means for controlling the operation of the notching mechanisms, and relay means responsive to the power supplied to the motor for governing the operation of the sequence drum.

THEODOR BUCHHOLD.